(12) United States Patent
De Mondt et al.

(10) Patent No.: US 10,022,956 B2
(45) Date of Patent: *Jul. 17, 2018

(54) MANUFACTURING OF DECORATIVE SURFACES BY INKJET

(71) Applicants: AGFA GRAPHICS NV, Mortsel (BE); Unilin BvbA, Wielsbeke (BE)

(72) Inventors: Roel De Mondt, Mortsel (BE); Laurent Meersseman, Mortsel (BE)

(73) Assignees: AGFA NV, Mortsel (BE); UNILIN BVBA, Wielsbeke (BE)

( * ) Notice: Subject to any disclaimer, the term of this patent is extended or adjusted under 35 U.S.C. 154(b) by 208 days.

This patent is subject to a terminal disclaimer.

(21) Appl. No.: 14/917,042

(22) PCT Filed: Feb. 27, 2014

(86) PCT No.: PCT/EP2014/053868
§ 371 (c)(1),
(2) Date: Mar. 7, 2016

(87) PCT Pub. No.: WO2015/058865
PCT Pub. Date: Apr. 30, 2015

(65) Prior Publication Data
US 2016/0193857 A1    Jul. 7, 2016

(30) Foreign Application Priority Data

Oct. 22, 2013    (EP) .................... 13189667

(51) Int. Cl.
*B41J 11/00*    (2006.01)
*B41M 5/00*    (2006.01)
(Continued)

(52) U.S. Cl.
CPC ................ *B41J 2/01* (2013.01); *B32B 37/10* (2013.01); *B32B 38/145* (2013.01);
(Continued)

(58) Field of Classification Search
CPC ... B41J 2/01; B41J 2/21; B41J 11/0015; B41J 11/002; B32B 37/10; B32B 38/145;
(Continued)

(56) References Cited

U.S. PATENT DOCUMENTS

| 4,500,373 | A | * | 2/1985 | Kubota | B44C 1/205 |
| | | | | | 156/154 |
| 4,654,099 | A | * | 3/1987 | Sandman | B32B 37/00 |
| | | | | | 156/220 |
| 6,369,171 | B2 | * | 4/2002 | Dupre | C08G 12/422 |
| | | | | | 425/502 |
| 6,599,592 | B1 | | 7/2003 | Schulz | |

(Continued)

FOREIGN PATENT DOCUMENTS

DE    10 2010 003 437 A1    10/2011
EP       1 044 822 A1    10/2000

(Continued)

OTHER PUBLICATIONS

Official Communication issued in International Patent Application No. PCT/EP2014/053868, dated Apr. 10, 2014.

(Continued)

*Primary Examiner* — Anh T. N. Vo
(74) *Attorney, Agent, or Firm* — Keating and Bennett, LLP

(57) ABSTRACT

A method for manufacturing decorative surfaces includes the steps of inkjet printing a color pattern with one or more aqueous inkjet inks including a polyurethane based latex binder; impregnating a paper substrate with a thermosetting resin; and heat pressing the thermosetting resin impregnated paper substrate carrying the inkjet printed color pattern into a decorative surface.

13 Claims, 1 Drawing Sheet

(51) Int. Cl.
- *B41M 5/28* (2006.01)
- *B41M 7/00* (2006.01)
- *B41J 2/01* (2006.01)
- *B41M 5/52* (2006.01)
- *E04F 13/08* (2006.01)
- *E04F 15/02* (2006.01)
- *B32B 37/10* (2006.01)
- *B32B 38/00* (2006.01)
- *E04B 1/61* (2006.01)

(52) U.S. Cl.
CPC ........ *B41J 11/0015* (2013.01); *B41M 5/0011* (2013.01); *B41M 5/5263* (2013.01); *E04B 1/54* (2013.01); *E04B 1/6125* (2013.01); *E04F 13/0871* (2013.01); *E04F 13/0894* (2013.01); *E04F 15/02038* (2013.01); *B32B 2260/028* (2013.01); *B32B 2260/046* (2013.01); *B32B 2419/04* (2013.01); *B32B 2479/00* (2013.01); *B32B 2607/00* (2013.01); *B41M 7/0027* (2013.01); *B41M 7/0045* (2013.01); *B41M 7/0054* (2013.01)

(58) Field of Classification Search
CPC . B32B 38/164; B41M 5/0011; B41M 5/0017; B41M 5/0045; B41M 5/0047; B41M 5/0054; B41M 5/5263; B41M 5/5281; B41M 7/00; B41M 7/0018; B41M 7/0027
See application file for complete search history.

(56) References Cited

U.S. PATENT DOCUMENTS

| | | | |
|---|---|---|---|
| 6,928,779 B2* | 8/2005 | Moriau | B27F 1/06 52/403.1 |
| 9,650,532 B2* | 5/2017 | De Mondt | B44C 5/04 |
| 9,724,932 B2* | 8/2017 | Torfs | B44C 5/04 |
| 2002/0185033 A1* | 12/2002 | Shepard | B41M 3/14 106/31.6 |
| 2003/0039810 A1 | 2/2003 | Schulz et al. | |
| 2013/0127961 A1 | 5/2013 | Klein et al. | |
| 2016/0207307 A1* | 7/2016 | De Mondt | B41M 5/0011 |

FOREIGN PATENT DOCUMENTS

| | | | |
|---|---|---|---|
| EP | 1 101 623 A2 | 5/2001 | |
| EP | 1338632 * | 8/2003 | ............ C09D 11/00 |
| EP | 1 700 689 A1 | 9/2006 | |
| EP | 2 431 190 A2 | 3/2012 | |
| EP | 2 574 476 A1 | 4/2013 | |
| EP | 2623567 * | 8/2013 | ............ C09D 11/00 |
| WO | 2013/050910 A2 | 4/2013 | |

OTHER PUBLICATIONS

De Mondt et al., "Inkjet Printing Methods for Manufacturing of Decorative Surfaces", U.S. Appl. No. 14/914,033, filed Feb. 24, 2016.

De Mondt et al., "Manufacturing of Decorative Surfaces by Inkjet", U.S. Appl. No. 14/914,032, filed Feb. 24, 2016.

* cited by examiner

MANUFACTURING OF DECORATIVE SURFACES BY INKJET

CROSS-REFERENCE TO RELATED APPLICATIONS

This application is a 371 National Stage Application of PCT/EP2014/053868, filed Feb. 27, 2014. This application claims the benefit of European Application No. 13189667.2, filed Oct. 22, 2013, which is incorporated by reference herein in its entirety.

BACKGROUND OF THE INVENTION

1. Field of the Invention

The present invention relates to the manufacturing of decorative surfaces using inkjet technology.

2. Description of the Related Art

Gravure, offset and flexography are being increasingly replaced for different applications by industrial inkjet printing systems, which have now proven their flexibility in use, such as variable data printing making short production runs and personalized products possible, and their enhanced reliability, allowing incorporation into production lines.

Inkjet technology has also caught the attention of manufacturers of decorative surfaces, such as laminate floor. In the current production process for manufacturing decorative panels as shown by FIG. 1, a paper manufacturer (11) supplies a paper roll (12) to a decor printer (13) who uses gravure printing (14) in order to deliver a decor paper roll (16) to a warehouse (17) of a floor laminate manufacturer (20). Some decor printers (13) are now investigating inkjet printing (15) instead of gravure printing. Rotogravure printing on the porous decor paper generally uses ink having a viscosity at 25° C. of 1 to 2 Pa·s. The viscosity of inkjet inks is much lower, often about 1 to 15 mPa·s at 25° C., which makes it necessary to use a more expensive paper having a special ink-receiving layer in order to obtain a good image quality. The floor laminate manufacturer (20) stores the decor paper rolls (16) having different decorative patterns in his warehouse (17). Depending on the market demand, the floor laminate manufacturer (20) then selects the decor rolls (16) with the desired decorative pattern from his warehouse (17). The selected decor rolls (16) are then impregnated (18) and cut to size (19) for manufacturing ready-to-use floor laminate (21). The warehouse (17) is necessary as a buffer for sudden large market demands of a specific floor laminate because there is a large time delay between ordering and delivering of new decorative paper rolls (16). Often the floor laminate manufacturer (20) also has a second warehouse (not shown) containing resin impregnated printed sheets available for manufacturing ready-to-use floor laminate (21) when manufacturing problems or delays occur in the impregnation line.

An approach to reduce the size of the warehouse and time delays is treated by EP 2431190 A (THEODOR HYMMEN), which discloses in FIG. 1 a method for producing a digitally printed sheet, web or plate-shaped workpiece (20) with wear-resistant surface including the steps of:

A) providing a digital data set to a digital printing device (1);

B) providing a printable workpiece (20) to the printing apparatus (1);

C) digital printing at least an acrylate printing ink (22) on the printable workpiece (20) using the printing apparatus (1) and thereafter supplying a resin mixture (5, 21) to the digitally printed workpiece; and D) curing the resin mixture (5, 21) by means of a heated press (7). The time delay can be avoided by the floor laminate manufacturer incorporating the manufacturing of decorative paper rolls into its own production process. EP 2431190 A (THEODOR HYMMEN) discloses in FIG. 2 the use of a paper substrate having a special ink receiving layer (23), which in combination with a more expensive acrylate ink only increases the cost of the final product. Furthermore, paragraph [0003] discloses that the use of acrylate ink leads to adhesion problems between the reactive melamine resin mixture and the acrylate ink, requiring specific measures like crosslinking agents that react only above 50° C. or 70° C., making the manufacturing process less robust. Another way to resolve this problem is to replace the melamin resin impregnated protective layer by a less wear resistant acrylate varnish layer.

Hence, there is still a need for improved manufacturing methods of decorative surfaces using inkjet technology and melamine resin as a wear coating.

SUMMARY OF THE INVENTION

In order to overcome the problems described above, preferred embodiments of the present invention have been realised with a method for manufacturing decorative surfaces as described below.

A much simpler solution has been found by rethinking the entire manufacturing process and using aqueous inkjet inks including a polyurethane based latex binder. The use of such inkjet inks eliminates the need for a special ink-receiving layer on the paper substrate, in order to obtain good image quality. Simultaneously problems of incomplete and inhomogeneous resin impregnation due to the presence of such an ink-receiving layer on the paper surface are also avoided.

It was also observed that a too high ink lay down caused adhesion problems and blister formation when the different layers are heat-pressed together to form a decorative panel. A thermosetting resin, like a melamine formaldehyde resin (MF), polycondensates when exposed to heat in a pressing operation. The polycondensation reaction of MF resin creates water as a by-product, which must leave the hardening resin layer. The ink layer acts as a barrier layer for this water vapour, resulting in the observed adhesion problems and blister formation. However, these problems were not observed when using aqueous inkjet inks including a polyurethane based latex binder, contrary to aqueous inkjet inks including other types of latex binders or UV curable acrylate based inkjet inks.

Another advantage observed when using aqueous inkjet inks including a polyurethane based latex binder is that good results were obtained regardless if inkjet printing was performed on resin impregnated or non-resin impregnated paper substrates. This allows for a larger flexibility in manufacturing.

The major advantageous effect of invention is the much simpler manufacturing process of decorative panels, which is immediately visible by comparing FIG. 1 and FIG. 2 showing that our invention requires no longer an intermediate decor printer company (13) or a warehouse (17). Printing in-house at the floor laminate manufacturer (20) allows for maximum flexibility. Changes in design of a decorative colour pattern can be rapidly introduced in production, thereby also minimizing dependency on supply by the decor printer company (13). There are also no longer minimum purchase quantities to be negotiated with the decor printer company (13). In-house printing allows for fast adaptability to market trends and an increase of product variety without substantial financial penalties.

The replacement of gravure by inkjet also has many advantages. There is no longer a storage of gravure rolls necessary. Furthermore, inkjet allows easy colour reproduction compared to the time consuming colour matching issues in gravure which usually may take up to 5 hours of tuning. This immediately also illustrates that short print runs using inkjet is much more cost-efficient than gravure.

Resin impregnation can cause major paper loss. Financial loss is minimized if the paper is first impregnated and then inkjet printed, because less digital print has to be thrown away. Another advantage of first impregnating and then inkjet printing is dimensional stability, allowing for a wood grain to be embossed in perfect alignment of the inkjet printed wood colour pattern.

Further advantages and preferred embodiments of the present invention will become apparent from the following description.

DETAILED DESCRIPTION OF THE PREFERRED EMBODIMENTS

Definitions

Figure 1:
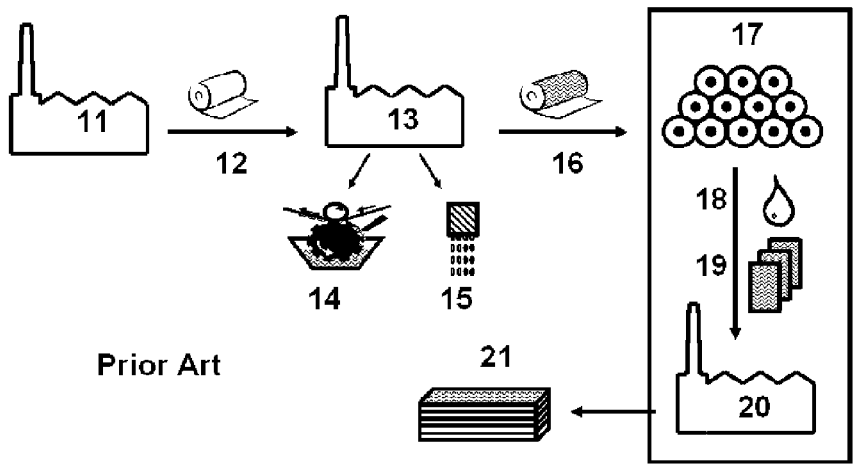
FIG. 1 shows the prior art production process for manufacturing decorative panels, wherein a paper manufacturer (11) supplies a paper roll (12) to a decor printer (13) using gravure printing (14) or inkjet printing (15) in order to deliver a decor paper roll (16) to a warehouse (17) of a floor laminate manufacturer (20). Depending on the market demand, the floor laminate manufacturer (20) selects one of the different decor rolls in his warehouse (17) to impregnate (18) and to cut to a size (19) for being heat pressed and finished into ready-to-use floor laminate (21).
Figure 2:
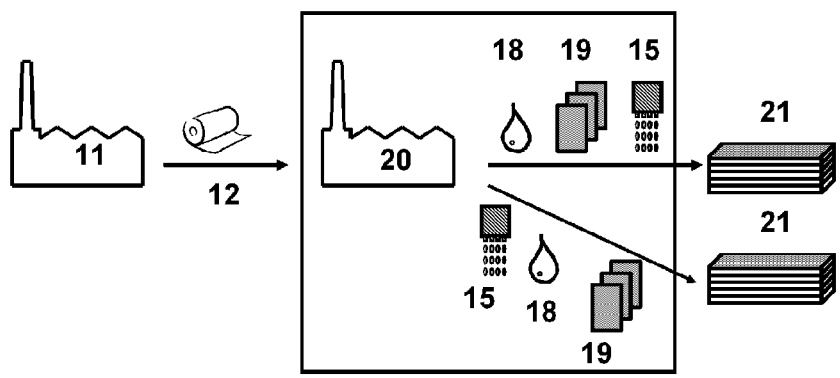
FIG. 2 shows a production process for manufacturing decorative panels, wherein a paper manufacturer (11) supplies a paper roll (12) directly to a floor laminate manufacturer (20) who impregnates (18) the paper roll (12), cuts to a size (19) for being inkjet printed (15) and then heat pressed and finished into ready-to-use floor laminate (21). The current invention also provides for the order of inkjet printing (15) on non-impregnated paper, then impregnating (18) the printed paper with thermosetting resin and cutting to sheets (19).

The term "alkyl" means all variants possible for each number of carbon atoms in the alkyl group i.e. methyl, ethyl, for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethyl-propyl and 2-methyl-butyl, etc.

Unless otherwise specified a substituted or unsubstituted alkyl group is preferably a $C_1$ to $C_6$-alkyl group.

Unless otherwise specified a substituted or unsubstituted alkenyl group is preferably a $C_1$ to $C_6$-alkenyl group.

Unless otherwise specified a substituted or unsubstituted alkynyl group is preferably a $C_1$ to $C_6$-alkynyl group.

Unless otherwise specified a substituted or unsubstituted aralkyl group is preferably phenyl group or naphthyl group including one, two, three or more $C_1$ to $C_6$-alkyl groups.

Unless otherwise specified a substituted or unsubstituted alkaryl group is preferably a $C_1$ to $C_6$-alkyl group including a phenyl group or naphthyl group.

Unless otherwise specified a substituted or unsubstituted aryl group is preferably a phenyl group or naphthyl group Unless otherwise specified a substituted or unsubstituted heteroaryl group is preferably a five- or six-membered ring substituted by one, two or three oxygen atoms, nitrogen atoms, sulphur atoms, selenium atoms or combinations thereof.

The term "substituted", in e.g. substituted alkyl group means that the alkyl group may be substituted by other atoms than the atoms normally present in such a group, i.e. carbon and hydrogen. For example, a substituted alkyl group may include a halogen atom or a thiol group. An unsubstituted alkyl group contains only carbon and hydrogen atoms Unless otherwise specified a substituted alkyl group, a substituted alkenyl group, a substituted alkynyl group, a substituted aralkyl group, a substituted alkaryl group, a substituted aryl and a substituted heteroaryl group are preferably substituted by one or more substituents selected from the group consisting of methyl, ethyl, n-propyl, isopropyl, n-butyl, isobutyl and tertiary-butyl, ester, amide, ether, thioether, ketone, aldehyde, sulfoxide, sulfone, sulfonate ester, sulphonamide, —Cl, —Br, —I, —OH, —SH, —CN and —$NO_2$.

Methods for Manufacturing Decorative Surfaces

A method for manufacturing decorative surfaces according to the present invention includes the steps of:

inkjet printing a colour pattern with one or more aqueous inkjet inks including a polyurethane based latex binder;

impregnating a paper substrate with a thermosetting resin; and heat pressing the thermosetting resin impregnated paper substrate carrying the inkjet printed colour pattern into a decorative surface.

In a preferred embodiment, a method for manufacturing decorative surfaces includes, in order, the steps of:

a) inkjet printing a colour pattern with one or more aqueous inkjet inks including a polyurethane based latex binder on a paper substrate;

b) impregnating the inkjet printed paper substrate with a thermosetting resin; and c) heat pressing the thermosetting resin impregnated paper substrate carrying the inkjet printed colour pattern into a decorative surface.

In another preferred embodiment, a method for manufacturing decorative surfaces includes, in order, the steps of:

a) impregnating a paper substrate with a thermosetting resin;

b) inkjet printing a colour pattern with one or more aqueous inkjet inks including a polymer latex binder on the thermosetting resin impregnated paper; and c) heat pressing the thermosetting paper carrying the inkjet printed colour pattern into a decorative surface. In the latter, financial losses due to cutting errors are minimized.

The thermosetting resin impregnated paper carrying the inkjet printed colour pattern is heat pressed between a protective layer containing a thermosetting resin and a core layer, with the colour pattern facing the protective layer. In the latter, the thermosetting resin impregnated paper preferably includes a whitening agent for masking surface defects of the core layer.

Alternatively the thermosetting resin impregnated paper carrying the colour pattern is heat pressed as a protective layer into a decorative surface, with the colour pattern facing towards a core layer present in the decorative surface. The protective layer (or overlay) contains no or substantially no whitening agent because the overlay becomes transparent after heat pressing so that the colour pattern can be viewed. The colour pattern must face the core layer because otherwise the colour pattern would rapidly deteriorate through wear. In a further preferred embodiment the colour pattern includes as outermost ink layer a white ink layer. The outermost white ink layer means that the colour pattern inkjet printed on the overlay covered by a white ink layer, preferably applied by inkjet printing, but e.g. screen printing or flexographic printing is also possible. By having an outermost white ink layer on the colour pattern, the paper layer between the core layer and the overlay can be omitted, which represents not only a cost benefit but also a simplified manufacturing process.

In a preferred embodiment of the manufacturing method, the thermosetting resin impregnated paper includes a coloured paper substrate, more preferably a bulk coloured paper substrate. The use of a coloured paper substrate reduces the amount of inkjet ink required to form the colour pattern.

In a preferred embodiment of the manufacturing method, the coloured paper substrate is prepared by impregnating the paper substrate with a coloured thermosetting resin.

In a preferred embodiment of the manufacturing method, the protective layer includes hard particles in an amount between 1 $g/m^2$ and 100 $g/m^2$.

In a preferred embodiment of the manufacturing method, the thermosetting resin is a melamine based resin. A melamine based resin is preferred not only because of its excellent physical properties against wear, but also because of the clear transparency after heat pressing showing no discolouration.

In a preferred embodiment of the manufacturing method, the protective layer includes hard particles in an amount between 1 $g/m^2$ and 100 $g/m^2$.

In a preferred embodiment, the method of manufacturing a decorative surface comprises the step of hot pressing at least the core layer and the decorative layer which includes a colour pattern and a thermosetting resin provided paper. Preferably the method forms part of a DPL (Direct Pressure Laminate) process as above described, wherein the decorative layer is taken up in a stack to be pressed with the core layer and a balancing layer, and preferably also a protective layer. It is of course not excluded that the method would form part of a CPL (Compact Laminate) or an HPL (High Pressure Laminate) process in which the decorative layer is hot pressed at least with a plurality of resin impregnated core paper layers, e.g. of so called Kraft paper, forming a substrate underneath the decorative layer, and wherein the obtained pressed and cured laminate layer, or laminate board is, in the case of an HPL, glued to a further substrate, such as to a particle board or an MDF or HDF board.

In a preferred embodiment, a protective layer containing a thermosetting resin is applied onto the inkjet printed colour pattern, wherein the thermosetting resin may be a colored thermosetting resin to reduce the amount of inkjet ink to be printed.

In a particularly preferred embodiment of the manufacturing method, at least the protective layer includes a relief corresponding to the colour pattern. The relief in at least the protective layer is preferably provided by means of a short cycle embossing press. The embossing preferably takes place at the same time that the core layer, the decorative layer and the protective layer, and preferably also one or more balancing layers, are pressed together.

Preferably the relief comprises portions that have been embossed over a depth of more than 0.5 mm, or even more than 1 mm, with respect to the global upper surface of the decorative panel. The embossments may extend into the decorative layer.

The balancing layer of a decorative panel is preferably planar. However, a relief might be applied in the balancing layer(s) for improving gluing down of the panels and/or for improved slip resistance and/or for improved, i.e. diminished, sound generation or propagation.

It should be clear that the use of more than one press treatment is also advantageous for the manufacturing of decorative surfaces. Such technique could be used for the manufacturing of any panel that comprises on the one hand a wear resistant protective layer on the basis of a thermosetting synthetic material, possibly a carrier sheet such as paper, and hard particles, and, on the other hand, one or more layers underlying the wear resistant protective layer on the basis of thermosetting synthetic material. The underlying layers may comprise a decorative layer, such as a inkjet printed paper provided with thermosetting resin. As a core layer, such panel might essentially comprise a board material with a density of more than 500 $kg/m^3$, such as an MDF or HDF board material. The manufacturing panels with a plurality of press treatments is preferably put in practice with the so-called DPL panels. In the latter case, during a first press treatment, at least the decorative layer provided with thermosetting resin, is cured and attached to the core material, preferably an MDF or HDF board material, whereby a whole is obtained of at least the decorative layer and the board material, and possibly a balancing layer at the side of the board opposite the decor layer. During a second press treatment, the wear resistant layer is cured and attached to the obtained whole.

In a preferred embodiment, the one or more aqueous inkjet inks are one or more pigmented aqueous inkjet inks. Pigmented aqueous inkjet inks exhibit a higher stability against light fading.

In a preferred embodiment of the manufacturing method, the one or more aqueous inkjet inks include an aqueous inkjet ink containing a colour pigment selected from the group consisting of C.I. Pigment Yellow 151, C.I. Pigment Yellow 74, and mixed crystals thereof.

In a preferred embodiment of the manufacturing method, the one or more aqueous inkjet inks include an aqueous inkjet ink containing a colour pigment selected from the group consisting of C.I. Pigment Red 254, C.I. Pigment Red 122, and mixed crystals thereof.

In a particularly preferred embodiment of the manufacturing method, the one or more aqueous inkjet inks form an aqueous inkjet ink set including:

a) a cyan aqueous inkjet ink containing a copper phthalocyanine pigment;

b) a red aqueous inkjet ink containing a colour pigment selected from the group consisting of C.I. Pigment Red 254, C.I. Pigment Red 122, and mixed crystals thereof;

c) a yellow aqueous inkjet ink containing a colour pigment selected from the group consisting of C.I. Pigment Yellow 151, C.I. Pigment Yellow 74, and mixed crystals thereof; and d) a black aqueous inkjet ink containing carbon black pigment. The use of such an aqueous CRYK inkjet ink set allows reducing the amount of inkjet ink required to reproduce a wooden decor for a floor laminate.

In a preferred embodiment of the manufacturing method, the one or more aqueous inkjet inks are inkjet printed at a jetting temperature of not more than 35° C.

For having a good ejecting ability and fast inkjet printing, the viscosity of the one or more aqueous inkjet inks at a temperature of 25° C. is preferably smaller than 30 mPa·s, more preferably smaller than 15 mPa·s, and most preferably between 1 and 10 mPa·s all measured at a shear rate of 1,000 s$^{-1}$. A preferred jetting temperature is between 10 and 70° C., more preferably between 20 and 40° C., and most preferably between 24 and 35° C.

In a preferred embodiment of the manufacturing method, the inkjet printing is performed by a single pass printing inkjet printing process. This allows for a high productivity (m$^2$ decorative surface per hour). Alternatively a plurality of multipass inkjet printers is used.

In a very preferred embodiment, the method of manufacturing of decorative surface includes the following steps:

inkjet printing a colour pattern and impregnating a paper with a thermosetting resin to produce a decorative layer; and applying the decorative layer and a protective layer including a thermosetting resin impregnated paper on a mostly wood-based core layer by means of a short cycle embossing press and optionally at the same time creating relief in at least the protective layer. The thermosetting resin used is preferably a resin or a combination of resins selected from the group consisting of melamine resin, urea resin, acrylate dispersion, acrylate copolymer dispersion and polyester resins, but is preferably a melamine resin.

In an even more preferred embodiment, the decorative layer and the protective layer are applied on a mostly wood-based core layer by means of a short cycle embossing press and at the same time a relief is created in at least the protective layer. The mostly wood-based core is preferably MDF or HDF.

The decorative panel obtained by the above preferred manufacturing methods preferably includes at least:

1) a transparent, preferably melamine based, protective layer;
2) an inkjet printed colour pattern;
3) a core, preferably an MDF or HDF core; and optionally
4) a relief at an upper surface. In a preferred embodiment, the decorative panel includes the relief at the upper surface. In a preferred embodiment, the decorative panel has an AC3 classification, more preferably an AC4 classification in accordance with EN 13329.

The decorative panel is preferably selected from the group consisting of flooring, kitchen, furniture and wall panels, and more preferably includes a tongue and a groove capable of achieving a glue less mechanical join.

Aqueous Inkjet Inks

The one or more aqueous inkjet inks used in the manufacturing method include a polyurethane based latex binder and as colorant preferably a pigment.

The aqueous inkjet ink contains preferably at least 2 wt %, more preferably at least 4 wt % of polyurethane based latex binder expressed as solids and based on the total weight of the inkjet ink. Aqueous inkjet ink containing 2 wt % or less of polyurethane based latex binder tend to show more bleeding;

A preferred aqueous inkjet ink set for manufacturing decorative surfaces consists of a) a cyan aqueous inkjet ink containing a copper phthalocyanine pigment;
b) a red aqueous inkjet ink containing a colour pigment selected from the group consisting of C.I. Pigment Red 254, C.I. Pigment Red 122, and mixed crystals thereof;
c) a yellow aqueous inkjet ink containing a colour pigment selected from the group consisting of C.I. Pigment Yellow 151, C.I. Pigment Yellow 74, and mixed crystals thereof; and
d) a black aqueous inkjet ink containing carbon black pigment, wherein the aqueous inkjet inks include a polyurethane based latex binder.

The aqueous inkjet inks preferably have a surface tension between 18.0 and 45.0 mN/m at 25° C. An aqueous inkjet ink with a surface tension smaller than 18.0 mN/m at 25° C. includes a high amount of surfactant, which may cause problems of foaming. A surface tension greater than 45.0 mN/m at 25° C. often leads to insufficient spreading of the ink on the thermosetting resin impregnated paper.

Colorants

The colorant in the one or more aqueous inkjet inks can be a dye, but is preferably a colour pigment. The one or more pigmented aqueous inkjet inks preferably contain a dispersant, more preferably a polymeric dispersant, for dispersing the pigment. The one or more aqueous inkjet inks may contain a dispersion synergist to improve the dispersion quality and stability of the ink.

In another preferred embodiment of the one or more pigmented aqueous inkjet inks, the one or more pigmented aqueous inkjet inks contain a so-called "self dispersible" colour pigment. A self-dispersible colour pigment requires no dispersant, because the pigment surface has ionic groups which realize electrostatic stabilization of the pigment dispersion. In case of self-dispersible colour pigments, the steric stabilization obtained by using a polymeric dispersant becomes optional. The preparation of self-dispersible colour pigments is well-known in the art and can be exemplified by EP 904327 A (CABOT).

The colour pigments may be black, white, cyan, magenta, yellow, red, orange, violet, blue, green, brown, mixtures thereof, and the like. A colour pigment may be chosen from those disclosed by HERBST, Willy, et al. Industrial Organic Pigments, Production, Properties, Applications. 3rd edition. Wiley—VCH, 2004. ISBN 3527305769.

A particularly preferred pigment for a cyan aqueous inkjet ink is a copper phthalocyanine pigment, more preferably C.I. Pigment Blue 15:3 or C.I. Pigment Blue 15:4.

Particularly preferred pigments for a red aqueous inkjet ink are C.I. Pigment Red 254 and C.I. Pigment Red 122, and mixed crystals thereof.

Particularly preferred pigments for yellow aqueous inkjet ink are C.I. Pigment Yellow 151 and C.I. Pigment Yellow 74, and mixed crystals thereof.

For the black ink, suitable pigment materials include carbon blacks such as Regal™ 400R, Mogul™ L, Elftex™ 320 from Cabot Co., or Carbon Black FW18, Special Black™ 250, Special Black™ 350, Special Black™ 550, Printex™ 25, Printex™ 35, Printex™ 55, Printex™ 90, Printex™ 150T from DEGUSSA Co., MA8 from MITSUBISHI CHEMICAL Co., and C.I. Pigment Black 7 and C.I. Pigment Black 11.

Also mixed crystals may be used. Mixed crystals are also referred to as solid solutions. For example, under certain conditions different quinacridones mix with each other to form solid solutions, which are quite different from both physical mixtures of the compounds and from the compounds themselves. In a solid solution, the molecules of the components enter into the same crystal lattice, usually, but not always, that of one of the components. The x-ray diffraction pattern of the resulting crystalline solid is characteristic of that solid and can be clearly differentiated from the pattern of a physical mixture of the same components in the same proportion. In such physical mixtures, the x-ray pattern of each of the components can be distinguished, and the disappearance of many of these lines is one of the criteria of the formation of solid solutions. A commercially available example is Cinquasia™ Magenta RT-355-D from Ciba Specialty Chemicals.

Also mixtures of pigments may be used. For example, the inkjet ink includes a carbon black pigment and at least one pigment selected from the group consisting of a blue pigment, a cyan pigment, magenta pigment and a red pigment. It was found that such a black inkjet ink allowed easier and better colour management for wood colours.

The pigment particles in the pigmented inkjet ink should be sufficiently small to permit free flow of the ink through the inkjet printing device, especially at the ejecting nozzles. It is also desirable to use small particles for maximum colour strength and to slow down sedimentation.

The average particle size of the pigment in the pigmented inkjet ink should be between 0.005 µm and 15 µm. Preferably, the average pigment particle size is between 0.005 and 5 µm, more preferably between 0.005 and 1 µm, particularly preferably between 0.005 and 0.3 µm and most preferably between 0.040 and 0.150 µm.

A white inkjet ink preferably includes a pigment with a high refractive index, preferably a refractive index greater than 1.60, preferably greater than 2.00, more preferably greater than 2.50 and most preferably greater than 2.60. Such white pigments generally have a very covering power, i.e. a limited amount of white ink is necessary to hide the colour and defects of the core layer. The most preferred white pigment is titanium dioxide.

The white inkjet ink preferably contains the white pigment in an amount of 5 wt % to 30 wt %, more preferably 8 to 25 wt % of white pigment based upon the total weight of the white inkjet ink.

The numeric average particle diameter of the white pigment is preferably from 50 to 500 nm, more preferably from 150 to 400 nm, and most preferably from 200 to 350 nm. Sufficient hiding power cannot be obtained when the average diameter is less than 50 nm, and the storage ability and the jet-out suitability of the ink tend to be degraded when the average diameter exceeds 500 nm.

The pigment is used in the pigmented inkjet ink in an amount of 0.1 to 20 wt %, preferably 1 to 10 wt %, and most preferably 2 to 5 wt % based on the total weight of the pigmented inkjet ink. A pigment concentration of at least 2 wt % is preferred to reduce the amount of inkjet ink needed to produce the colour pattern, while a pigment concentration higher than 5 wt % reduces the colour gamut for printing the colour pattern with print heads having a nozzle diameter of 20 to 50 µm.

Dispersants

The pigmented inkjet ink preferably contains a dispersant, more preferably a polymeric dispersant, for dispersing the pigment.

Suitable polymeric dispersants are copolymers of two monomers but they may contain three, four, five or even more monomers. The properties of polymeric dispersants depend on both the nature of the monomers and their distribution in the polymer. Copolymeric dispersants preferably have the following polymer compositions:

statistically polymerized monomers (e.g. monomers A and B polymerized into ABBAABAB);

alternating polymerized monomers (e.g. monomers A and B polymerized into ABABABAB);

gradient (tapered) polymerized monomers (e.g. monomers A and B polymerized into AAABAABBABBB);

block copolymers (e.g. monomers A and B polymerized into AAAAABBBBBB) wherein the block length of each of the blocks (2, 3, 4, 5 or even more) is important for the dispersion capability of the polymeric dispersant;

graft copolymers (graft copolymers consist of a polymeric backbone with polymeric side chains attached to the backbone); and mixed forms of these polymers, e.g. blocky gradient copolymers.

Suitable dispersants are DISPERBYK™ dispersants available from BYK CHEMIE, JONCRYL™ dispersants available from JOHNSON POLYMERS and SOLSPERSE™ dispersants available from ZENECA. A detailed list of non-polymeric as well as some polymeric dispersants is disclosed by M C CUTCHEON. Functional Materials, North American Edition. Glen Rock, N.J.: Manufacturing Confectioner Publishing Co., 1990. p. 110-129.

The polymeric dispersant has preferably a number average molecular weight Mn between 500 and 30000, more preferably between 1500 and 10000.

The polymeric dispersant has preferably a weight average molecular weight Mw smaller than 100,000, more preferably smaller than 50,000 and most preferably smaller than 30,000.

In a particularly preferred embodiment, the polymeric dispersant used in the one or more pigmented inkjet inks is a copolymer comprising between 3 and 11 mol % of a long aliphatic chain (meth)acrylate wherein the long aliphatic chain contains at least 10 carbon atoms.

The long aliphatic chain (meth)acrylate contains preferably 10 to 18 carbon atoms. The long aliphatic chain (meth)acrylate is preferably decyl(meth)acrylate. The polymeric dispersant can be prepared with a simple controlled polymerization of a mixture of monomers and/or oligomers including between 3 and 11 mol % of a long aliphatic chain (meth)acrylate wherein the long aliphatic chain contains at least 10 carbon atoms.

A commercially available polymeric dispersant being a copolymer comprising between 3 and 11 mol % of a long aliphatic chain (meth)acrylate is Edaplan™ 482, a polymeric dispersant from MUNZING.

Polymer Latex Binders

The polymer latex binder is a water-insoluble polymer. The polymer latex binder is a polyurethane based latex binder, more preferably a self-dispersible polyurethane based latex binder. The term "polyurethane based" means that the majority of the polymer in the polymer latex binder consists of polyurethane. Preferably at least 50 wt %, more preferably at least 70 wt % of the polymer in the polyurethane based latex binder consists of polyurethane. A very high amount of polyurethane assures for high compatibility with the thermosetting resin.

In a particularly preferred embodiment, the one or more aqueous inkjet inks include inter-crosslinkable latex particles. Suitable examples are disclosed by EP 2467434 A (HP), however preferably the inter-crosslinking is obtained using (meth)acrylate groups. In the latter preferably one or more photoinitiators and optionally co-initiators are present. This allows for pincuring by UV exposure the inkjet printed latex which results in a higher image quality.

Monomers that can be included in the polyurethane latex binder include, without limitation, styrene, p-methyl styrene, methyl methacrylate, hexyl acrylate, hexyl methacrylate, 2-ethylhexyl acrylate, 2-ethylhexyl methacrylate, butyl acrylate, butyl methacrylate, ethyl acrylate, ethyl methacrylate, propyl acrylate, propyl methacrylate, octadecyl acrylate, stearyl methacrylate, vinylbenzyl chloride, isobornyl acrylate, tetrahydrofurfuryl acrylate, 2-phenoxyethyl methacrylate, ethoxylated nonyl phenol methacrylate, isobornyl methacrylate, cyclohexyl methacrylate, t-butyl methacrylate, n-octyl methacrylate, lauryl methacrylate, tridecyl methacrylate, alkoxylated tetrahydrofurfuryl acrylate, isodecyl acrylate, isobornylmethacrylate, derivatives thereof, and mixtures thereof.

The polymerized monomers of the latex particulates preferably include a crosslinker that crosslinks the polymerized monomers and enhances the durability of the composite latex particulate. Suitable cross-linking monomers are polyfunctional monomers and oligomers such as, without limitation, ethylene glycol dimethacrylate, diethylene glycol dimethacrylate, ethylene glycol diacrylate, diethylene glycol diacrylate, 1,6-hexanediol diacrylate, tetraethylene glycol diacrylate, tripropylene glycol diacrylate, ethoxylated bisphenol A diacrylate, pentaerythritol tri- and tetraacrylate, N,N'-methylenebisacrylamide, divinylbenzene and combinations thereof, mixtures thereof, and derivatives thereof. When present, the cross-linkers preferably comprise from 0.1 wt % to 15 wt % of the polymerized monomers.

The polymer latex is preferably a self-dispersing polymer latex, and more preferably a self-dispersing polymer latex having a carboxyl group, from the viewpoint of ejecting stability and stability of the liquid (particularly, dispersion stability) when using a colour pigment. A self-dispersing polymer latex means that it does not require a free emulsifier and that can get into a dispersed state in an aqueous medium even in the absence of other surfactants due to a functional group (particularly, an acidic group or a salt thereof) that the polymer itself has.

In preparing a self-dispersing polymer latex, preferably a monomer is used selected from the group consisting of an unsaturated carboxylic acid monomer, an unsaturated sulfonic acid monomer, and an unsaturated phosphoric acid monomer.

Specific examples of the unsaturated carboxylic acid monomer include acrylic acid, methacrylic acid, crotonic acid, itaconic acid, maleic acid, fumaric acid, citraconic acid, and 2-methacryloyloxy methylsuccinic acid. Specific examples of the unsaturated sulfonic acid monomer include styrene sulfonic acid, 2-acrylamido-2-methyl propane sulfonic acid, 3-sulfopropyl (meth)acrylate, and bis-(3-sulfopropyl)-itaconate. Specific examples of the unsaturated phosphoric acid monomer include vinyl phosphoric acid, vinyl phosphate, bis(methacryloxyethyl)phosphate, diphenyl-2-acryloyloxyethyl phosphate, diphenyl-2-methacryloyloxyethyl phosphate, and dibutyl-2-acryloyloxyethyl phosphate.

The latex binder polymer particles preferably have a glass transition temperature (Tg) of no more than 70° C., more preferably no more than 50° C.

The minimum film-forming temperature (MFT) of the polymer latex is preferably between −50 and 70° C., more preferably between −40 and 50° C.

The average particle size of the polyurethane based latex binder particles in the inkjet ink is preferably less than 300 nm, more preferably less than 200 nm as measured by laser diffraction, e.g. using a Beckman Coulter™ LS 13320.

Biocides

Suitable biocides for the aqueous inkjet inks include sodium dehydroacetate, 2-phenoxyethanol, sodium benzoate, sodium pyridinethion-1-oxide, ethyl p-hydroxybenzoate and 1,2-benzisothiazolin-3-one and salts thereof.

Preferred biocides are Proxel™ GXL and Proxel™ Ultra 5 available from ARCH UK BIOCIDES and Bronidox™ available from COGNIS.

A biocide is preferably added in an amount of 0.001 to 3.0 wt. %, more preferably 0.01 to 1.0 wt. %, each based on the total weight of the pigmented inkjet ink.

Humectants

Suitable humectants include triacetin, N-methyl-2-pyrrolidone, 2-pyrrolidone, glycerol, urea, thiourea, ethylene urea, alkyl urea, alkyl thiourea, dialkyl urea and dialkyl thiourea, diols, including ethanediols, propanediols, propanetriols, butanediols, pentanediols, and hexanediols; glycols, including propylene glycol, polypropylene glycol, ethylene glycol, polyethylene glycol, diethylene glycol, tetraethylene glycol, and mixtures and derivatives thereof. Preferred humectants are 2-pyrrolidone, glycerol and 1,2-hexanediol, since the latter were found to be the most effective for improving inkjet printing reliability in an industrial environment.

The humectant is preferably added to the inkjet ink formulation in an amount of 0.1 to 35 wt % of the formulation, more preferably 1 to 30 wt % of the formulation, and most preferably 3 to 25 wt % of the formulation.

pH Adjusters

The aqueous inkjet inks may contain at least one pH adjuster. Suitable pH adjusters include NaOH, KOH, NEt$_3$, NH$_3$, HCl, HNO$_3$, H$_2$SO$_4$ and (poly)alkanolamines such as triethanolamine and 2-amino-2-methyl-1-propaniol. Preferred pH adjusters are triethanol amine, NaOH and H$_2$SO$_4$.

Surfactants

The one or more aqueous inkjet inks may contain at least one surfactant. The surfactant(s) can be anionic, cationic, non-ionic, or zwitter-ionic and are usually added in a total quantity less than 5 wt % based on the total weight of the inkjet ink and particularly in a total less than 2 wt % based on the total weight of the inkjet ink.

The one or more aqueous inkjet inks preferably have a surface tension between 18.0 and 45.0 mN/m at 25° C., more preferably between a surface tension between 21.0 and 39.0 mN/m at 25° C.

Suitable surfactants for the aqueous inkjet inks include fatty acid salts, ester salts of a higher alcohol, alkylbenzene sulphonate salts, sulphosuccinate ester salts and phosphate ester salts of a higher alcohol (for example, sodium dodecylbenzenesulphonate and sodium dioctylsulphosuccinate), ethylene oxide adducts of a higher alcohol, ethylene oxide adducts of an alkylphenol, ethylene oxide adducts of a polyhydric alcohol fatty acid ester, and acetylene glycol and ethylene oxide adducts thereof (for example, polyoxyethylene nonylphenyl ether, and SURFYNOL™ 104, 104H, 440, 465 and TG available from AIR PRODUCTS & CHEMICALS INC.).

Preferred surfactants are selected from fluoro surfactants (such as fluorinated hydrocarbons) and/or silicone surfactants.

The silicone surfactants are preferably siloxanes and can be alkoxylated, polyester modified, polyether modified, polyether modified hydroxy functional, amine modified, epoxy modified and other modifications or combinations thereof. Preferred siloxanes are polymeric, for example polydimethylsiloxanes. Preferred commercial silicone surfactants include BYK™ 333 and BYK™ UV3510 from BYK Chemie.

A particularly preferred commercial fluorosurfactant is Capstone™ FS3100 from DU PONT.

Preparation of Inkjet Inks

The one or more aqueous inkjet inks may be prepared by precipitating or milling the colour pigment in the dispersion medium in the presence of the polymeric dispersant, or simply by mixing a self-dispersible colour pigment in the ink.

Mixing apparatuses may include a pressure kneader, an open kneader, a planetary mixer, a dissolver, and a Dalton Universal Mixer. Suitable milling and dispersion apparatuses are a ball mill, a pearl mill, a colloid mill, a high-speed disperser, double rollers, a bead mill, a paint conditioner, and triple rollers. The dispersions may also be prepared using ultrasonic energy.

If the inkjet ink contains more than one pigment, the colour ink may be prepared using separate dispersions for each pigment, or alternatively several pigments may be mixed and co-milled in preparing the dispersion.

The dispersion process can be carried out in a continuous, batch or semi-batch mode.

The preferred amounts and ratios of the ingredients of the mill grind will vary widely depending upon the specific materials and the intended applications. The contents of the milling mixture comprise the mill grind and the milling media. The mill grind comprises pigment, dispersant and a liquid carrier such as water. For aqueous ink-jet inks, the pigment is usually present in the mill grind at 1 to 50 wt %, excluding the milling media. The weight ratio of pigment over dispersant is 20:1 to 1:2.

The milling time can vary widely and depends upon the pigment, mechanical means and residence conditions selected, the initial and desired final particle size, etc. In the present invention pigment dispersions with an average particle size of less than 100 nm may be prepared.

After milling is completed, the milling media is separated from the milled particulate product (in either a dry or liquid dispersion form) using conventional separation techniques, such as by filtration, sieving through a mesh screen, and the like. Often the sieve is built into the mill, e.g. for a bead mill. The milled pigment concentrate is preferably separated from the milling media by filtration.

In general it is desirable to make the colour ink in the form of a concentrated mill grind, which is subsequently diluted to the appropriate concentration for use in the ink-jet printing system. This technique permits preparation of a greater quantity of pigmented ink from the equipment. If the mill grind was made in a solvent, it is diluted with water and optionally other solvents to the appropriate concentration. If it was made in water, it is diluted with either additional water or water miscible solvents to make a mill grind of the desired concentration. By dilution, the ink is adjusted to the desired viscosity, colour, hue, saturation density, and print area coverage for the particular application.

Decorative Surfaces

The decorative surfaces are preferably rigid or flexible panels, but may also be rolls of a flexible substrate. In a preferred embodiment the decorative panels are selected from the group consisting of kitchen panels, flooring panels, furniture panels, ceiling panels and wall panels.

Figure 3:
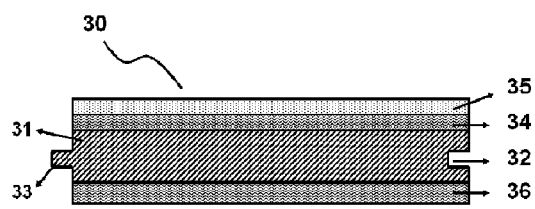
FIG. 3 shows a cross-section of a decorative panel (30) including a core layer (31) with a groove (32) and tongue (33) which is laminated on the top side by a decorative layer (34) and a protective layer (35) and on the back side by a balancing layer (36).

A decorative panel (30), illustrated by a flooring panel having also a tongue and groove join (33, 32) in FIG. 3, includes preferably at least a core layer (31) and a decorative layer (34). In order to protect the colour pattern of the decorative layer (34) against wear, a protective layer (35) may be applied on top of the decorative layer (34). A balancing layer (36) may also be applied at the opposite side of the core layer (31) to restrict or prevent possible bending of the decorative panel (30). The assembly into a decorative panel of the balancing layer, the core layer, the decorative layer, and preferably also a protective layer, is preferably performed in the same press treatment of preferably a DPL process (Direct Pressure Laminate).

In a preferred embodiment of decorative panels, tongue and groove profiles (33 respectively 32 in FIG. 3) are milled into the side of individual decorative panels which allow them to be slid into one another. The tongue and grove join ensures, in the case of flooring panels, a sturdy floor construction and protects the floor, preventing dampness from penetrating.

Figure 4:
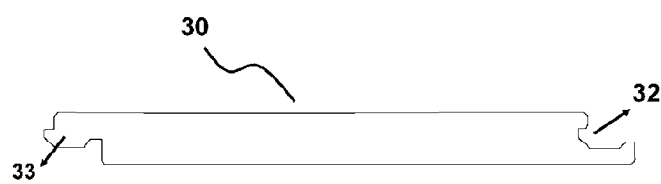
FIG. 4. shows a cross section of a decorative panel (30) having a mechanical join by a tongue (33) and a groove (32) requiring no glue.

In a more preferred embodiment, the decorative panels include a tongue and a groove of a special shape (e.g. 33 respectively 32 in FIG. 4) which allow them to be clicked into one another. The advantage thereof is an easy assembly requiring no glue. The shape of the tongue and groove necessary for obtaining a good mechanical join is well-known in the art of laminate flooring, as also exemplified in EP 2280130 A (FLOORING IND), WO 2004/053258 (FLOORING IND), US 2008010937 (VALINGE) and U.S. Pat. No. 6,418,683 (PERSTORP FLOORING).

The tongue and groove profiles are especially preferred for flooring panels and wall panels, but in the case of furniture panels, such tongue and groove profile is preferably absent for aesthetical reasons of the furniture doors and drawer fronts. However, a tongue and groove profile may be used to click together the other panels of the furniture, as illustrated by US 2013071172 (UNILIN).

The decorative surfaces, especially decorative panels, may further include a sound-absorbing layer as disclosed by U.S. Pat. No. 8,196,366 (UNILIN).

In a preferred embodiment, the decorative panel is an antistatic layered panel. Techniques to render decorative panels antistatic are well-known in the art of decorative surfaces as exemplified by EP 1567334 A (FLOORING IND).

The top surface of the decorative surface, i.e. at least the protective layer, is preferably provided with a relief matching the colour pattern, such as for example the wood grain, cracks and nuts in a woodprint. Embossing techniques to accomplish such relief are well-known and disclosed by, for example, EP 1290290 A (FLOORING IND), US 2006144004 (UNILIN), EP 1711353 A (FLOORING IND) and US 2010192793 (FLOORING IND).

In a preferred embodiment, the decorative panels are made in the form of rectangular oblong strips. The dimensions thereof may vary greatly. Preferably the panels have a length exceeding 1 meter, and a width exceeding 0.1 meter, e.g. the panels can be about 1.3 meter long and about 0.15 meter wide. According to a special preferred embodiment the length of the panels exceeds 2 meter, with the width being preferably about 0.2 meter or more. The print of such panels is preferably free form repetitions.

Core Layers

The core layer is preferably made of wood-based materials, such as particle board, MDF or HDF (Medium Density Fibreboard or High Density Fibreboard), Oriented Strand Board (OSB) or the like. Also, use can be made of boards of synthetic material or boards hardened by means of water, such as cement boards. In a particularly preferred embodiment, the core layer is a MDF or HDF board.

The core layer may also be assembled at least from a plurality of paper sheets, or other carrier sheets, impregnated with a thermosetting resin as disclosed by WO 2013/050910 (UNILIN). Preferred paper sheets include so-called Kraft paper obtained by a chemical pulping process also known as the Kraft process, e.g. as described in U.S. Pat. No. 4,952,277 (BET PAPERCHEM).

In another preferred embodiment, the core layer is a board material composed substantially of wood fibres which are bonded by means of a polycondensation glue, wherein the polycondensation glue forms 5 to 20 percent by weight of the board material and the wood fibres are obtained for at least 40 percent by weight from recycled wood. Suitable examples are disclosed by EP 2374588 A (UNILIN).

Instead of a wood based core layer, also a synthetic core layer may be used ,such as those disclosed by US 2013062006 (FLOORING IND). In a preferred embodiment, the core layer comprises a foamed synthetic material, such as foamed polyethylene or foamed polyvinyl chloride.

Other preferred core layers and their manufacturing are disclosed by US 2011311806 (UNILIN) and U.S. Pat. No. 6,773,799 (DECORATIVE SURFACES).

The thickness of the core layer is preferably between 2 and 12 mm, more preferably between 5 and 10 mm.

Paper Substrates

The decorative layer and preferably, if present also the protective layer and/or balancing layer, include paper as substrate.

The paper preferably has a weight of less than 150 g/m$^2$, because heavier paper sheets are hard to impregnate all through their thickness with a thermosetting resin. Preferably said paper layer has a paper weight, i.e. without taking into account the resin provided on it, of between 50 and 100 g/m$^2$ and possibly up to 130 g/m$^2$. The weight of the paper cannot be too high, as then the amount of resin needed to sufficiently impregnate the paper would be too high, and reliably further processing the printed paper in a pressing operation becomes badly feasible.

Preferably, the paper sheets have a porosity according to Gurley's method (DIN 53120) of between 8 and 20 seconds. Such porosity allows even for a heavy sheet of more than 150 g/m$^2$ to be readily impregnated with a relatively high amount of resin.

Suitable paper sheets having high porosity and their manufacturing are also disclosed by U.S. Pat. No. 6,709,764 (ARJO WIGGINS).

The paper for the decorative layer is preferably a white paper and may include one or more whitening agents, such as titanium dioxide, calcium carbonate and the like. The presence of a whitening agent helps to mask differences in colour on the core layer which can cause undesired colour effects on the colour pattern.

Alternatively, the paper for the decorative layer is preferably a bulk coloured paper including one or more colour dyes and/or colour pigments. Besides the masking of differences in colour on the core layer, the use of a coloured paper reduces the amount of inkjet ink required to print the colour pattern. For example, a light brown or grey paper may be used for printing a wood motif as colour pattern in order to reduce the amount of inkjet ink needed.

In a preferred embodiment, unbleached Kraft paper is used for a brownish coloured paper in the decorative layer. Kraft paper has a low lignin content resulting in a high tensile strength. A preferred type of Kraft paper is absorbent Kraft paper of 40 to 135 g/m$^2$ having a high porosity and made from clean low kappa hardwood Kraft of good uniformity.

If the protective layer includes a paper, then a paper is used a which becomes transparent or translucent after resin impregnation so that for the colour pattern in the decorative layer can be viewed.

The above papers may also be used in the balancing layer.

It was found in the present invention that no special ink receiving layer or substance was necessary for obtaining good image quality. Hence, the paper is preferably free of any separate ink receiving layer upon printing.

For the sake of clarity, it should be clear that resin coated papers, so-called RC papers, are not the thermosetting resin impregnated papers of the manufacturing method according to the invention. The RC papers used in home/office aqueous inkjet printing consist of a porous paper core free of resin. The RC papers have only on their surface a resin coating, usually a polyethylene or polypropylene resin coating, with thereon one or more ink receiving layers, usually containing a hydrophilic polymer like polyvinylalcohol and optionally porous pigments like fumed silica. Such RC papers have a low permeability for the thermosetting resin leading to inhomogeneous resin absorption and higher risk for delamination after pressing.

Thermosetting Resins

The thermosetting resin is preferably selected from the group consisting of melamine-formaldehyde based resins, ureum-formaldehyde based resins and phenol-formaldehyde based resins.

Other suitable resins for impregnating the paper are listed in [0028] of EP 2274485 A (HUELSTA).

Most preferably the thermosetting resin is a melamine-formaldehyde based resin, often simply referred to in the art as a 'melamine (based) resin'.

The melamine formaldehyde resin preferably has a formaldehyde to melamine ratio of 1.4 to 2. Such melamine based resin is a resin that polycondensates while exposed to heat in a pressing operation. The polycondensation reaction creates water as a by-product. It is particularly with these kinds of thermosetting resins, namely those creating water as a by-product, that the present invention is of interest. The created water, as well as any water residue in the thermosetting resin before the pressing, must leave the hardening resin layer to a large extent before being trapped and leading to a loss of transparency in the hardened layer. The available ink layer can hinder the diffusion of the vapour bubbles to the surface, however the present invention provides measures for limiting such hindrance.

The paper is preferably provided with an amount of thermosetting resin equalling 40 to 250% dry weight of resin as compared to weight of the paper. Experiments have shown that this range of applied resin provides for a sufficient impregnation of the paper, that avoids splitting to a large extent, and that stabilizes the dimension of the paper to a high degree.

The paper is preferably provided with such an amount of thermosetting resin, that at least the paper core is satisfied with the resin. Such satisfaction can be reached when an amount of resin is provided that corresponds to at least 1.5 or at least 2 times the paper weight. Preferably the paper is firstly impregnated through or satisfied, and, afterwards, at least at the side thereof to be printed, resin is partially removed.

Preferably the resin provided on said paper is in a B-stage while printing. Such B-stage exists when the thermosetting resin is not completely cross linked.

Preferably the resin provided on said paper has a relative humidity lower than 15%, and still better of 10% by weight or lower while printing.

Preferably the step of providing said paper with thermosetting resin involves applying a mixture of water and the resin on the paper. The application of the mixture might involve immersion of the paper in a bath of the mixture and/or spraying or jetting the mixture. Preferably the resin is provided in a dosed manner, for example by using one or more squeezing rollers and/or doctor blades to set the amount of resin added to the paper layer.

Methods for impregnating a paper substrate with resin are well-known in the art as exemplified by WO 2012/126816 (VITS) and EP 966641 A (VITS).

The dry resin content of the mixture of water and resin for impregnation depends on the type of resin. An aqueous solution containing a phenol-formaldehyde resin preferably has a dry resin content of about 30% by weight, while an aqueous solution containing a melamine-formaldehyde resin preferably has a dry resin content of about 60% by weight. Methods of impregnation with such solutions are disclosed by e.g. U.S. Pat. No. 6,773,799 (DECORATIVE SURFACES).

The paper is preferably impregnated with the mixtures known from U.S. Pat. No. 4,109,043 (FORMICA CORP) and U.S. Pat. No. 4,112,169 (FORMICA CORP), and hence preferably comprise, next to melamine formaldehyde resin, also polyurethane resin and/or acrylic resin.

The mixture including the thermosetting resin may further include additives, such as colorants, surface active ingredients, biocides, antistatic agents, hard particles for wear resistance, elastomers, UV absorbers, organic solvents, acids, bases, and the like.

The advantage of adding a colorant to the mixture containing the thermosetting resin is that a single type of white paper can be used for manufacturing the decorative layer, thereby reducing the stock of paper for the decorative laminate manufacturer. The use of a colored paper, as already described above, to reduce the amount of ink required for printing a wood motif, is here accomplished by the white paper being colored by impregnation by a brownish thermosetting resin. The latter allows a better control of the amount of brown colour required for certain wood motifs.

Antistatic agents may be used in thermosetting resin. However preferably antistatic agents, like NaCl and KCl, carbon particles and metal particles, are absent in the resin, because often they have undesired side effects such as a lower water resistance or a lower transparency. Other suitable antistatic agents are disclosed by EP 1567334 A (FLOORING IND).

Hard particles for wear resistance are preferably included in a protective layer.

Decorative Layers

The decorative layer includes a thermosetting resin impregnated paper and a colour pattern printed thereon by inkjet. In the assembled decorative panel, the colour pattern is located on the resin impregnated paper on the opposite side than the side facing the core layer.

In one preferred embodiment, before printing a colour pattern, or at least a portion thereof, the paper that has been provided with resin. This measure improves the stability of the paper. In such cases at least a portion of the expansion or shrinkage due to the resin provision takes place before inkjet printing. Preferably the resin provided paper is dried before inkjet printing, for example to a residual humidity of 10% or less. In this case the most important portion of the expansion or shrinkage of the paper layer is neutralized. The advantage of having this dimensional stability is especially observed in the cases where, like in EP 1290290 A (FLOORING IND), a correspondence between the relief and the printed decor is desired.

A decorative panel, like a floor panel, has on one side of the core layer a decorative layer and a balancing layer on the other side of the core layer. However, a decorative layer may be applied on both sides of the core layer. The latter is especially desirable in the case of laminate panels for furniture. In such a case, preferably also a protective layer is applied on both decorative layers present on both sides of the core layer.

Colour Patterns

The colour pattern is obtained by jetting and drying one or more aqueous inkjet inks. There is no real restriction on the content of the colour pattern. The colour pattern may also contain information such as text, arrows, logo's and the like. The advantage of inkjet printing is that such information can be printed at low volume without extra cost, contrary to gravure printing.

In a preferred embodiment, the colour pattern is a wood reproduction or a stone reproduction, but it may also be a fantasy or creative pattern, such as an ancient world map or a geometrical pattern, or even a single colour for making, for example, a floor consisting of black and red tiles or a single colour furniture door.

An advantage of printing a wood colour pattern is that a floor can be manufactured imitating besides oak, pine and beech, also very expensive wood like black walnut which would normally not be available for house decoration.

An advantage of printing a stone colour pattern is that a floor can be manufactured which is an exact imitation of a stone floor, but without the cold feeling when walking barefooted on it.

Protective Layers

Preferably a further resin layer, a protective layer, is applied above the printed pattern after printing, e.g. by way of an overlay, i.e. a resin provided carrier, or a liquid coating, preferably while the decor layer is laying on the substrate, either loosely or already connected or adhered thereto.

In a preferred embodiment, the carrier of the overlay is a paper impregnated by a thermosetting resin that becomes transparent or translucent after heat pressing in a DPL process.

A preferred method for manufacturing such an overlay is described in US 2009208646 (DEKOR-KUNSTSTOFFE).

The liquid coating includes preferably a thermosetting resin, but may also be another type of liquid such as a UV- or an EB-curable varnish.

In a particularly preferred embodiment, the liquid coating includes a melamine resin and hard particles, like corundum.

The protective layer is preferably the outermost layer, but in another preferred embodiment a thermoplastic or elastomeric surface layer may be coated on the protective layer, preferably of pure thermoplastic or elastomeric material. In the latter case, preferably a thermoplastic or elastomeric material based layer is also applied on the other side of the core layer.

Liquid melamine coatings are exemplified in DE 19725289 C (ITT MFG ENTERPRISES) and U.S. Pat. No. 3,173,804 (RENKL PAIDIWERK).

The liquid coating may contain hard particles, preferably transparent hard particles. Suitable liquid coatings for wear protection containing hard particles and methods for manufacturing such a protective layer are disclosed by US 2011300372 (CT FOR ABRASIVES AND REFRACTORIES) and U.S. Pat. No. 8,410,209 (CT FOR ABRASIVES AND REFRACTORIES).

The transparency and also the colour of the protective layer can be controlled by the hard particles, when they comprise one or a plurality of oxides, oxide nitrides or mixed oxides from the group of elements Li, Na, K, Ca, Mg, Ba, Sr, Zn, Al, Si, Ti, Nb, La, Y, Ce or B.

The total quantity of hard particles and transparent solid material particles is typically between 5% by volume and 70% by volume, based on the total volume of the liquid coating. The total quantity of hard particles is between 1 g/m² and 100 g/m², preferably 2 g/m² to 50 g/m².

If the protective layer includes a paper as carrier sheet for the thermosetting resin, then the hard particles, such as aluminium oxide particles, are preferably incorporated in or on the paper. Preferred hard particles are ceramic or mineral particles chosen from the group of aluminium oxide, silicon carbide, silicon oxide, silicon nitride, tungsten carbide, boron carbide, and titanium dioxide, or from any other metal oxide, metal carbide, metal nitride or metal carbonitride. The most preferred hard particles are corundum and so-called Sialon ceramics. In principle, a variety of particles may be used. Of course, also any mixture of the above-mentioned hard particles may be applied.

In an alternative preferred embodiment of a protective layer including a paper as carrier sheet for the thermosetting resin, the inkjet printing is performed on the thermosetting resin impregnated paper of the protective layer. The other paper substrate including a whitening agent, such as titanium dioxide, may then merely be used to mask surface defects of the core layer.

The amount of hard particles in the protective layer may determined in function of the desired wear resistance, preferably by a so-called Taber test as defined in EN 13329 and also disclosed in WO 2013/050910 A (UNILIN) and U.S. Pat. No. 8,410,209 (CT FOR ABRASIVES AND REFRACTOR).

Hard particles having an average particle size of between 1 and 200 µm are preferred. Preferably an amount of such particles of between 1 and 40 g/m² is applied above the printed pattern. An amount lower than 20 g/m² can suffice for the lower qualities.

If the protective layer includes a paper, then it preferably has a paper weight of between 10 and 50 g/m². Such a paper is often also referred to as a so-called overlay commonly used in laminate panels. Preferred methods for manufacturing such an overlay are disclosed by WO 2007/144718 (FLOORING IND).

Preferably the step of providing the protective layer of thermosetting resin above the printed pattern involves a press treatment. Preferably a temperature above 150° C. is applied in the press treatment, more preferably between 180° and 220° C., and a pressure of more than 20 bar, more preferably between 35 and 40 bar.

In a very preferred embodiment, the decorative panel is manufactured using two press treatments, because this results in an extremely high abrasion resistance. Indeed, during the first press treatment, preferably the layers immediately underlying the wear resistant protective layer are substantially or wholly cured. The hard particles comprised in the wear resistant protective layer are thereby prevented from being pushed down out of the top area of the floor panel into the colour pattern or below the colour pattern and stay in the zone where they are most effective, namely essentially above the colour pattern. This males it possible to reach an initial wear point according to the Taber test as defined in EN 13329 of over 10000 rounds, where in one press treatment of layers with the same composition only just over 4000 rounds were reached. It is clear that the use of two press treatments as defined above, leads to a more effective use of available hard particles. An alternative advantage of using at least two press treatments lays in the fact that a similar wearing rate, as in the case where a single press treatment is used, can be obtained with less hard particles if the product is pressed twice. Lowering the amount of hard particles is interesting, since hard particles tend to lower the transparency of the wear resistant protective layer, which is undesirable. It becomes also possible to work with hard particles of smaller diameter, e.g. particles having an average particle diameter of 15 µm or less, or even of 5 µm or less.

Balancing Layers

The main purpose of the balancing layer(s) is to compensate tensile forces by layers on the opposite side of the core layer, so that an essentially flat decorative panel is obtained. Such a balancing layer is preferably a thermosetting resin layer, that can comprise one or more carrier layers, such as paper sheets.

As already explained above for a furniture panel, the balancing layer(s) may be a decorative layer, optionally complemented by a protective layer.

Instead of one or more transparent balancing layers, also an opaque balancing layer may be used which gives the decorative panel a more appealing look by masking surface irregularities. Additionally, it may contain text or graphical information such as a company logo or text information.

Inkjet Printing Devices

The one or more aqueous inkjet inks may be jetted by one or more print heads ejecting small droplets in a controlled manner through nozzles onto a substrate, which is moving relative to the print head(s).

A preferred print head for the inkjet printing system is a piezoelectric head. Piezoelectric inkjet printing is based on the movement of a piezoelectric ceramic transducer when a voltage is applied thereto. The application of a voltage changes the shape of the piezoelectric ceramic transducer in the print head creating a void, which is then filled with ink. When the voltage is again removed, the ceramic expands to its original shape, ejecting a drop of ink from the print head. However the manufacturing method according to the present invention is not restricted to piezoelectric inkjet printing. Other inkjet print heads can be used and include various types, such as a continuous type.

The inkjet print head normally scans back and forth in a transversal direction across the moving ink-receiver surface. Often the inkjet print head does not print on the way back. Bi-directional printing is preferred for obtaining a high area throughput. Another preferred printing method is by a "single pass printing process", which can be performed by using page wide inkjet print heads or multiple staggered inkjet print heads which cover the entire width of the ink-receiver surface. In a single pass printing process the inkjet print heads usually remain stationary and the substrate surface is transported under the inkjet print heads.

EXAMPLES

Materials

All materials used in the following examples were readily available from standard sources such as Aldrich Chemical Co. (Belgium) and Acros (Belgium) unless otherwise specified. The water used in the examples is demineralized water.

PR254 is the abbreviation for C.I. Pigment Red 254 for which Irgazin™ DPP Red BTR from Ciba Specialty Chemicals was used.

PM-1 is a 10/90 mixed crystal of C.I. Pigment Red 202 and C.I. Pigment Violet 19 available as Cromophtal™ Jet Magenta 2BC from BASF.

Edaplan is an abbreviation used for Edaplan™ 482, a polymeric dispersant from MUNZING.

Proxel is an abbreviation for the biocide Proxel™ Ultra 5 from AVECIA.

Vondic™ 2220 is a 40% polyurethane latex dispersion from DAINIPPON INK.

Tego Twin™ 4000 is a siloxane-based gemini surfactant from EVONIK.

SYN is the dispersion synergist according to Formula (A):

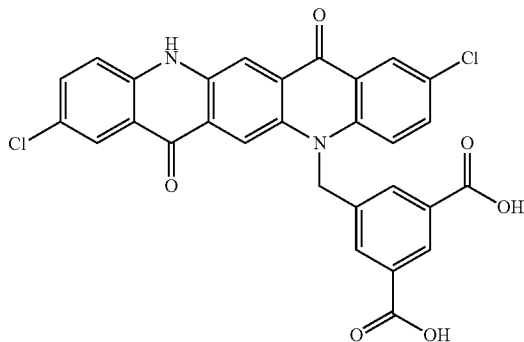 [SMILES: O=C(O)c1cc(Cn2c3ccc(Cl)cc3c(=O)c3cc4[nH]c5ccc(Cl)cc5c(=O)c4cc32)cc(C(=O)O)c1]

Formula (A), and was synthesized in the same manner as described in Example 1 of WO 2007/060254 (AGFA GRAPHICS) for the synergist QAD-3

INHIB is a mixture forming a polymerization inhibitor having a composition according to Table 1.

TABLE 1

| Component | wt % |
|---|---|
| DPGDA | 82.4 |
| p-methoxyphenol | 4.0 |
| 2,6-di-tert-butyl-4-methylphenol | 10.0 |
| Cupferron ™ AL | 3.6 |

Cupferron™ AL is aluminum N-nitrosophenylhydroxylamine from WAKO CHEMICALS LTD.

EFKA is a butylacrylate-vinylpyridine copolymer having an amine value of 40 mg KOH/g available as Efka™ 7701 from BASF.

DPGDA is dipropyleneglycoldiacrylate from SARTOMER.

PEA is 2-phenoxyethyl acrylate available as Sartomer™ SR339C from SARTOMER. PEA has a $T_g$ of 5° C.

IDA is isodecyl acrylate available as SR395 from SARTOMER.

ACMO is acryloyl morpholine available as Photomer™ 9301 from IGM.

IBOA is isobornylacrylate available as Sartomer™ SR506D from SARTOMER.

VCL is N-vinyl caprolactam available from BASF BELGIUM, NV.

ITX is Darocur™ ITX is an isomeric mixture of 2- and 4-isopropylthioxanthone from BASF.

Irgacure™ 379 is a photoinitiator available from BASF having as chemical structure:

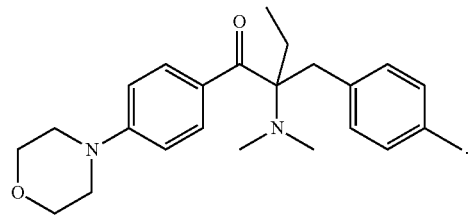 [SMILES: CCC(Cc1ccc(C)cc1)(C(=O)c1ccc(N2CCOCC2)cc1)N(C)C]

Omnirad™ 481 is 1-hydroxy-cyclohexyl-phenyl-ketone available from IGM.

CN3755 is an acrylated amine synergist available from SARTOMER.

Tegorad™ 2100 is an acrylated polydimethylsiloxane-glycidolsiloxane surfactant available from EVONIK.

Capstone™ FS3100 is a fluorosurfactant from DU PONT.

INK-STY is an abbreviation used for an aqueous latex magenta inkjet ink having a styrene latex with co-monomers of methylmethacrylate, butylacrylate en ethylhexylacrylate available as Mimaki™ LX100-M-60-2 from MIMAKI.

INK-ACRYL is an abbreviation used for an aqueous latex magenta inkjet ink having a latex substantially based on methylmethacrylate available as General Ink™ Magenta 104 from GENERAL COMPANY.

Measurement Methods

1. Viscosity

The viscosity of an inkjet ink was measured, using a Brookfield DV-II+ viscometer at 25° C. at a shear rate of 1,000 $s^{-1}$.

2. Average Particle Size

The average particle size diameter was determined with a Brookhaven Instruments Particle Sizer BI90plus based upon the principle of dynamic light scattering. The pigment dispersion was diluted with a solvent to a pigment concentration of 0.002 wt %. The solvent used for a UV curable pigment dispersion was ethyl acetate, while for an aqueous pigment dispersion water was used. The measurement settings of the BI90plus were: 5 runs at 23° C., angle of 90°, wavelength of 635 nm and graphics=correction function.

For good ink jet characteristics (jetting and print quality) the average particle size of the dispersed particles is preferably below 200 nm.

3. Adhesion

Adhesion is evaluated by a cross-cut test according to ISO2409:1992(E). Paints. *International standard.* 1992-08-15. using a Braive No. 1536 Cross Cut Tester from BRAIVE INSTRUMENTS with spacing of a 1 mm between cuts and using a weight of 600 g, in combination with a Tesatape™ 4104 PVC tape. The evaluation was made in accordance with a criterion described by Table 2.

TABLE 2

| Criterion | Observation |
|---|---|
| 0 | The edges of the cuts are completely smooth: none of the squares of the lattice is detached (=perfect adhesion). |
| 1 | Detachment of small flakes at the intersections of the cuts. A cross-cut area not greater than 5% is affected. |
| 2 | Flaked along the edges and/or at the intersections of the cuts. A cross-cut area greater than 5%, but not significantly greater than 15%, is affected. |
| 3 | Flaked along the edges of the cuts partly or wholly in large ribbons, and/or it has flaked partly or wholly on different parts of the squares. A cross-cut area significantly greater than 15%, but not significantly greater than 35%, is affected. |
| 4 | Flaked along the edges of the cuts in large ribbons, and/or some of the squares has detached partly or wholly. A cross-cut area significantly greater than 35%, but not significantly greater than 65%, is affected. |
| 5 | Any degree of flaking that cannot even be classified by classification 4 |

4. Bleeding

The colour bleeding of inks occurs due to the water vapour produced during the DPL process, which deplaces colour pigments or dyes. An evaluation was made in accordance with a criterion described in Table 3.

TABLE 3

| Criterion | Observation |
|---|---|
| 0 | no bleeding |
| 1 | some bleeding visible by microscope |
| 2 | some bleeding visible by the naked eye |
| 3 | large amount of bleeding visible by the naked eye |

Example 1

This example illustrates the effect of aqueous inkjet inks using a polyurethane based latex on adhesion and image quality compared to acrylate latex based injet inks and UV curable inkjet inks.

Preparation of Concentrated Pigment Dispersions

A concentrated aqueous pigment dispersion CPM-1 was made by mixing a composition according to Table 4 for 30 minutes using a Disperlux™ Yellow mixer.

TABLE 4

| Component | Concentration (wt %) |
|---|---|
| PR254 | 15.00 |
| Edaplan | 15.00 |
| Proxel | 0.02 |
| Water | to complete 100.00 wt % |

The concentrated aqueous pigment dispersion was then milled using a MINI-ZETA™ from NETZSCH with 0.04 mm yttrium stabilized zirconium beads YTZ™ Grinding Media (available from TOSOH Corp.). The mill was filled to half its volume with the grinding beads and the dispersion was milled for 2.5 hours at a rotation speed of 10 m/s. After milling, the dispersion is separated from the beads. The average particle size was 120 nm. The concentrated aqueous pigment dispersion served as the basis for the preparation of the aqueous magenta inkjet inks INK-1 and INK-2.

The concentrated pigment dispersion CPM-2 was prepared by mixing for 30 minutes the components according to Table 5 in a 20 L vessel. The vessel was then connected to a Bachofen DYNOMILL ECM Pilot mill having an internal volume of 1.5 L filled for 63% with 0.4 mm yttrium stabilized zirconia beads. The mixture was circulated over the mill for 2 hours at a flow rate of about 2 L per minute and a rotation speed in the mill of about 13 m/s. After milling the dispersion was separated from the beads using a filter cloth. The dispersion was then discharged into a 10 L vessel.

TABLE 5

| Component | Quantity (in g) |
|---|---|
| PM-1 | 1120 |
| SYN | 17 |
| EFKA | 2800 |
| INHIB | 70 |
| DPGDA | 2993 |

The average particle size was 178 nm.

Preparation of Inkjet Inks

The aqueous inkjet inks INK-1 and INK-2 including a polyurethane based latex binder were prepared by mixing the components according to the general formulation of Table 6 expressed in weight % based on the total weight of the ink. Water was added to complete the ink to the desired pigment concentration.

TABLE 6

| wt % of component | INK-1 | INK-2 |
|---|---|---|
| CPM-1 | 20.0 | 20.0 |
| Vondic ™ 2220 | 10.0 | 5.0 |
| Capstone ™ FS3100 | 0.6 | 0.6 |
| Tego Twin ™ 4000 | 0.2 | 0.2 |
| 2-pyrrolidone | 15.0 | 12.0 |
| 1,2-hexanediol | 15.0 | 12.0 |
| Water | 39.2 | 50.2 |

The aqueous inkjet inks including a polyurethane based latex binder INK-1 and INK-2 had a viscosity of 9.2 mPa·s respectively 6.9 mPa·s at 25° C.

The UV curable acrylate inkjet ink INK-UV was prepared by mixing the concentrated pigment dispersion CPM-2 with the components in Table 7

TABLE 7

| wt % of component | INK-UV |
|---|---|
| PM-1 | 4.50 |
| SYN | 0.12 |
| EFKA | 3.00 |
| DPGDA | 10.64 |
| PEA | 15.86 |
| IDA | 7.10 |
| ACMO | 14.74 |
| IBOA | 16.00 |
| VCL | 12.84 |
| ITX | 5.00 |
| Irgacure ™ 379 | 2.00 |
| Omnirad ™ 481 | 4.00 |
| CN3755 | 3.00 |
| INHIB | 1.00 |
| Tegorad ™ 2100 | 0.20 |

The UV curable acrylate inkjet ink INK-UV had a viscosity of 21.6 mPa·s at 25° C.

Evaluation and Results

A 70 g/m² porous paper from Schoeller Technocell GmbH & Co. KG used for decor printing was impregnated with an aqueous solution containing 60 wt % of melamine-formaldehyde based resin and dried before inkjet printing to a residual humidity of about 8 g/m². This paper substrate is indicated in Table 8 as paper IMP. The paper NON was impregnated in the same manner but after inkjet printing.

A decorative layer was obtained by printing a colour pattern on the melamine-formaldehyde based resin impregnated paper using the inkjet inks and a Dimatix™ DMP 2831 10 pl print head at a head temperature of 24° C. for the aqueous inkjet inks and at 45° C. for INK-UV.

An assembly was made as shown in FIG. 3, wherein the prepared decorative layer was interposed between a HDF core and protective layer of melamine-formaldehyde resin impregnated paper containing aluminium oxide for durability. The assembly was then heat pressed into a laminate by a DPL process at 40 kg/cm² for 20 seconds at 195° C.

The resulting floor laminates were evaluated for adhesion and bleeding, which is indicative for image quality. The results are shown in Table 8.

TABLE 8

| Sample | Inkjet Ink | Paper | Adhesion | Bleeding |
|---|---|---|---|---|
| 1 | INK-UV | NON | 4 | 0 |
| 2 | INK-UV | IMP | 4 | 3 |
| 3 | INK-STY | NON | 3 | 0 |
| 4 | INK-STY | IMP | 4 | 2 |

TABLE 8-continued

| Sample | Inkjet Ink | Paper | Adhesion | Bleeding |
|---|---|---|---|---|
| 5 | INK-ACRYL | NON | 3 | 0 |
| 6 | INK-ACRYL | IMP | 4 | 2 |
| 7 | INK-1 | NON | 0 | 0 |
| 8 | INK-2 | NON | 0 | 1 |
| 9 | INK-1 | IMP | 0 | 0 |

From Table 8, it should be clear that only the samples 7 to 8 using INK-1 and INK-2 exhibited excellent results for both adhesion and bleeding. The cured ink layer from a UV curable acrylate based inkjet ink clearly causes adhesion problems. Also the aqueous inkjet inks containing a styrene based or an acrylate based latex were found to exhibit adhesion problems. It should also be clear that aqueous inkjet inks containing a polyurethane based latex binder allow printing on both impregnated and non-impregnated paper.

REFERENCE SIGNS LIST

TABLE 9

| 11 | Paper manufacturer |
|---|---|
| 12 | Paper roll |
| 13 | Decor printer |
| 14 | Gravure printing |
| 15 | Inkjet printing |
| 16 | Decor Paper roll |
| 17 | Warehouse |
| 18 | Impregnation |
| 19 | Cutting to size |
| 20 | Floor laminate manufacturer |
| 21 | Floor laminate |
| 30 | Decorative panel |
| 31 | Core layer |
| 32 | Groove |
| 33 | Tongue |
| 34 | Decorative layer |
| 35 | Protective layer |
| 36 | Balancing layer |

The invention claimed is:

1. A method for manufacturing decorative surfaces, the method comprising the steps of:
   a) inkjet printing a color pattern with one or more pigmented aqueous inkjet inks including a polyurethane based latex binder;
   b) impregnating a paper substrate with a thermosetting resin; and
   c) heat pressing the thermosetting resin impregnated paper substrate including the inkjet printed color pattern into a decorative surface; wherein the one or more pigmented aqueous inkjet inks includes a red pigmented aqueous inkjet ink including a color pigment selected from the group consisting of C.I. Pigment Red 254, C.I. Pigment Red 122, and mixed crystals thereof.

2. The method according to claim 1, wherein the steps are performed in order of a), then b), and then c).

3. The method according to claim 1, wherein the steps are performed in order of b), then a), and then c).

4. The method according to claim 1, wherein the step of heat pressing includes heat pressing the thermosetting resin impregnated paper substrate including the inkjet printed color pattern between a protective layer including a thermosetting resin and a core layer, wherein the color pattern faces the protective layer.

5. The method according to claim 1, wherein the step of heat pressing includes heat pressing the thermosetting resin impregnated paper substrate including the color pattern as a protective layer into a decorative surface, wherein the color pattern faces a core layer of the decorative surface.

6. The method according to claim 5, wherein the color pattern includes a white ink layer as an outermost ink layer.

7. The method according to claim 5, wherein the protective layer includes particles in an amount between 1 $g/m^2$ and 100 $g/m^2$.

8. The method according to claim 5, wherein the protective layer is embossed with a relief corresponding to the color pattern.

9. The method according to claim 1, wherein the one or more pigmented aqueous inkjet inks define an aqueous inkjet ink set including:
   a cyan pigmented aqueous inkjet ink including a copper phthalocyanine pigment;
   the red pigmented aqueous inkjet ink;
   a yellow pigmented aqueous inkjet ink including a color pigment selected from the group consisting of C.I. Pigment Yellow 151, C.I. Pigment Yellow 74, and mixed crystals thereof; and
   a black pigmented aqueous inkjet ink including carbon black pigment.

10. The method according to claim 1, wherein the thermosetting resin is a melamine based resin.

11. The method according to claim 1, wherein the inkjet printing is performed using a single pass printing inkjet printing process.

12. A decorative panel obtained by the method according to claim 1, wherein the decorative panel is selected from the group consisting of flooring, kitchen, furniture, and wall panels.

13. The decorative panel according to claim 12, wherein the decorative panel includes a tongue and a groove mechanical joint that requires no glue.

* * * * *